United States Patent
Jo et al.

(10) Patent No.: US 10,615,428 B2
(45) Date of Patent: Apr. 7, 2020

(54) POROUS BODY FOR FUEL CELL

(71) Applicants: HYUNDAI MOTOR COMPANY, Seoul (KR); KIA MOTORS CORPORATION, Seoul (KR)

(72) Inventors: Jang Ho Jo, Yongin-si (KR); Soon Hong Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 176 days.

(21) Appl. No.: 15/703,000

(22) Filed: Sep. 13, 2017

(65) Prior Publication Data
US 2018/0175405 A1 Jun. 21, 2018

(30) Foreign Application Priority Data
Dec. 16, 2016 (KR) .................. 10-2016-0173036

(51) Int. Cl.
*H01M 8/0256* (2016.01)
*H01M 8/0258* (2016.01)
*H01M 8/0297* (2016.01)
*H01M 8/1004* (2016.01)
*H01M 8/0241* (2016.01)
*H01M 8/023* (2016.01)
H01M 8/1018 (2016.01)

(52) U.S. Cl.
CPC ......... *H01M 8/0258* (2013.01); *H01M 8/023* (2013.01); *H01M 8/0241* (2013.01); *H01M 8/0256* (2013.01); *H01M 8/0297* (2013.01); *H01M 8/1004* (2013.01); H01M 2008/1095 (2013.01)

(58) Field of Classification Search
CPC ............ H01M 8/0256; H01M 8/0258; H01M 8/0297; H01M 8/1004
See application file for complete search history.

(56) References Cited

U.S. PATENT DOCUMENTS

| 8,501,366 | B1* | 8/2013 | Song | H01M 8/1016 429/483 |
| 2001/0012576 | A1* | 8/2001 | Christiansen | H01M 8/0625 429/495 |
| 2002/0127459 | A1* | 9/2002 | Lenz | H01M 8/0228 429/468 |
| 2013/0011766 | A1* | 1/2013 | Lundblad | H01M 8/0202 429/492 |
| 2013/0052551 | A1* | 2/2013 | Ishikawa | H01M 8/0232 429/414 |

FOREIGN PATENT DOCUMENTS

JP 2004-079245 * 3/2004

OTHER PUBLICATIONS

Machine translation of JP 2004-079245, published on Mar. 11, 2004 (Year: 2004).*

* cited by examiner

*Primary Examiner* — Anca Eoff
(74) *Attorney, Agent, or Firm* — Morgan, Lewis & Bockius LLP

(57) ABSTRACT

A porous body for a fuel cell is interposed between a membrane-electrode assembly (MEA) and a bipolar plate to form a gas channel through which a reactant gas flows in a predetermined direction, the porous body including: a main body disposed to contact the bipolar plate; and a plurality of ribs each including a land portion disposed to contact the MEA and a connecting portion connecting the land portion to the main body, in which an area of the land portion is gradually narrowed from an upstream part to a downstream part of the gas channel.

11 Claims, 7 Drawing Sheets

POROUS BODY FOR FUEL CELL

CROSS-REFERENCE TO RELATED APPLICATION

This application is based on and claims the benefit of priority to Korean Patent Application No. 10-2016-0173036, filed on Dec. 16, 2016, with the Korean Intellectual Property Office, the disclosure of which is incorporated herein in its entirety by reference.

TECHNICAL FIELD

The present disclosure relates to a porous body for a fuel cell.

BACKGROUND

A fuel cell includes unit cells that can produce electrical energy through an electrochemical reaction of hydrogen and oxygen. The fuel cell is designed to have bipolar plates attached to both surfaces of a membrane electrode assembly (MEA), respectively. A bipolar plate includes a gas channel supplying reactant gases such as hydrogen and oxygen to the MEA and a cooling channel allowing a coolant to circulate.

The amount of water distributed in the MEA is generally increased from an upstream part to a downstream part of the gas channel of the bipolar plate. Thus, the MEA becomes dry in the upstream part of the gas channel, and becomes wet in the downstream part of the gas channel.

When the MEA becomes dry or wet compared to an appropriate level of humidity, the speed of the reactant gases passing through the MEA may be decreased, and thus performance of the fuel cell may be degraded and an electrolyte membrane of the MEA may be damaged to cause a reduction in durability. Therefore, in order to improve the performance and durability of the fuel cell, an appropriate amount of water should be distributed uniformly over an entire region of the MEA. However, a conventional fuel cell involves a problem in that it is not designed to uniformly distribute the appropriate amount of water to the MEA.

Further, the gas channel of the bipolar plate may be designed to decrease resistance near a supply manifold and an exhaust manifold for smooth supply and exhaust of the reactant gases. However, a conventional fuel cell involves a problem in that it is not designed to easily adjust resistance in the channels of the bipolar plate according to regions of the bipolar plate.

SUMMARY

The present disclosure has been made to solve the above-mentioned problems occurring in the prior art while advantages achieved by the prior art are maintained intact.

An aspect of the present disclosure provides a porous body for a fuel cell having a novel structure for uniformly distributing an appropriate amount of water to a membrane-electrode assembly (MEA) of the fuel cell.

An aspect of the present disclosure also provides a porous body for a fuel cell having a novel structure for easily adjusting resistance across a gas channel according to sections of the gas channel.

According to an aspect of the present disclosure, a porous body for a fuel cell, which is interposed between an MEA and a bipolar plate to form a gas channel through which a reactant gas flows in a predetermined direction, includes: a main body disposed to contact the bipolar plate; and a plurality of ribs each including a land portion disposed to contact the MEA and a connecting portion connecting the land portion to the main body, wherein an area of the land portion is gradually narrowed from an upstream part to a downstream part of the gas channel.

The main body may include a plurality of first holes perforated at predetermined intervals, and the connecting portion of each of the plurality of ribs may extend from an inner surface of each of the plurality of first holes to be connected to the inner surface of each of the plurality of first holes.

The sum of an area of the land portion and an area of the connecting portion may be the same as an area of each of the first holes.

The connecting portion may be inclined at a predetermined angle of inclination with respect to a direction of gas flow, and the angle of inclination may be increased from the upstream part of the gas channel to the downstream part thereof.

The plurality of ribs may be classified into a plurality of first ribs located in the upstream part of the gas channel and a plurality of second ribs located below the plurality of first ribs in the downstream part of the gas channel. Each of the plurality of first ribs may include a first land portion disposed to contact the MEA and a first connecting portion connecting the first land portion to the main body, and each of the plurality of second ribs may include a second land portion disposed to contact the MEA and having an area narrower than that of the first land portion and a second connecting portion connecting the second land portion to the main body.

Each of the plurality of second ribs may include a second hole perforated in the second land portion.

A direction of gas flow may be parallel to a direction of gravity, the first connecting portion may be inclined in a direction opposing the direction of gravity as the first connecting portion extends from the main body to the first land portion, and the second connecting portion may be inclined in a direction toward the direction of gravity as the second connecting portion extends from the main body to the second land portion.

A gas diffusion layer may be attached to the MEA, and the porous body may be interposed between the gas diffusion layer and the bipolar plate.

According to another aspect of the present disclosure, a porous body for a fuel cell, which is interposed between an MEA and a bipolar plate to form a gas channel through which a reactant gas flows in a predetermined direction, includes: a main body disposed to contact the bipolar plate; and a plurality of ribs each including a land portion disposed to contact the MEA and a connecting portion connecting the land portion to the main body, wherein the gas channel includes a power generation section facing the MEA and a diffusion section located above the power generation section in an upstream part of the gas channel, and an area of a land portion of a rib located in the diffusion section is narrower in a direction of gas flow than an area of a land portion of a rib located in the power generation section.

The gas channel may further include an exhaust section located below the power generation section in a downstream part of the gas channel, and an area of a land portion of a rib located in the exhaust section may be narrower in the direction of gas flow than the area of the land portion of the rib located in the power generation section.

The connecting portion may be inclined at a predetermined angle of inclination with respect to the direction of gas flow, and an angle of inclination may be higher in the ribs located in the diffusion section and the exhaust section than in the rib located in the power generation section.

A gas diffusion layer may be attached to the MEA, and the porous body may be interposed between the gas diffusion layer and the bipolar plate.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
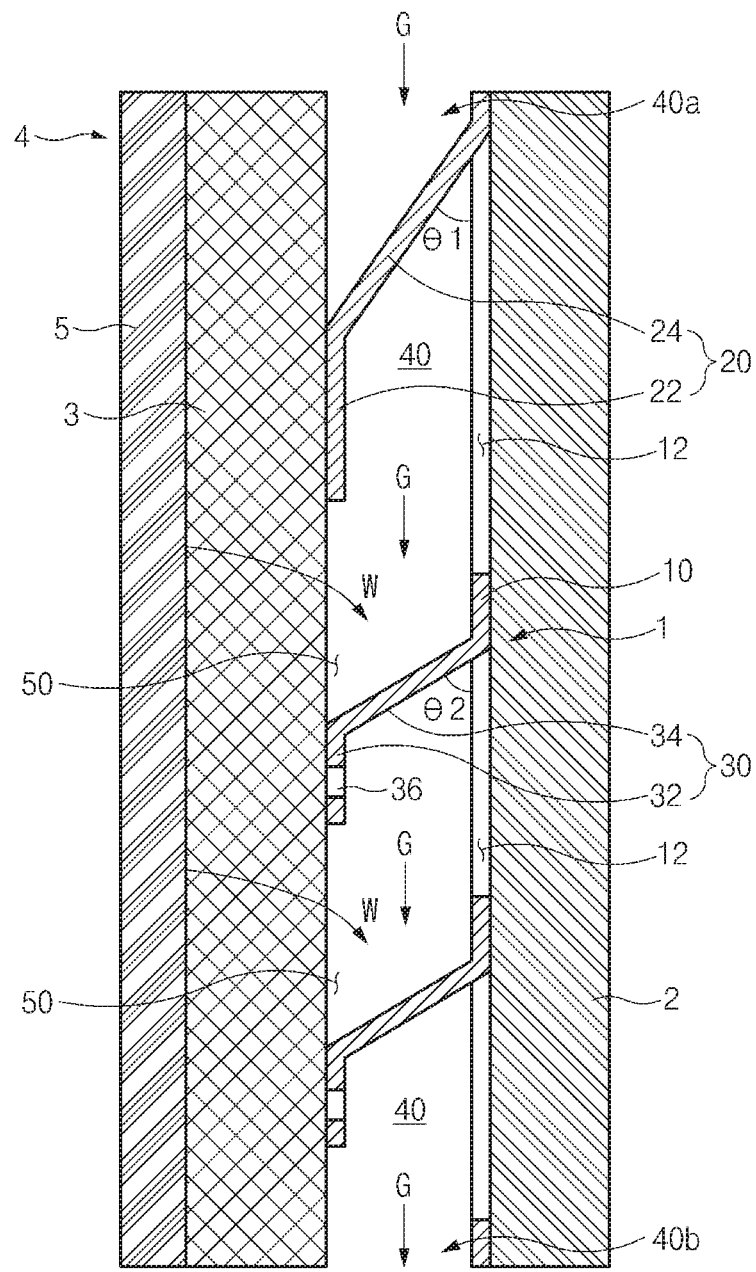
FIG. 1 illustrates a partial cross-sectional view of a fuel cell, to which a porous body for a fuel cell according to a first exemplary embodiment of the present disclosure is applied.

Hereinafter, exemplary embodiments of the present disclosure will be described in detail with reference to the accompanying drawings. Terms or words used in the present specification and claims should not be interpreted as being limited to accepted meanings or dictionary definitions, but should be interpreted as having meanings and concepts that comply with the technical ideas of the present disclosure based on the principle by which an inventor can appropriately define the concepts of the terms or words in order to describe the invention in the best way. Therefore, the embodiments described in the specification and the configuration of elements illustrated in the drawings are merely considered to be preferred embodiments and do not represent all the technical ideas of the present disclosure, and thus it should be understood that various equivalents and modifications may exist at the time of filing this application.

In the drawings, the shapes and dimensions of elements or portions of the elements may be exaggerated or schematically illustrated for convenience of explanation and clarity. In addition, a detailed description of a related known function or configuration will be ruled out in order not to unnecessarily obscure the gist of the present disclosure.

Figure 2:
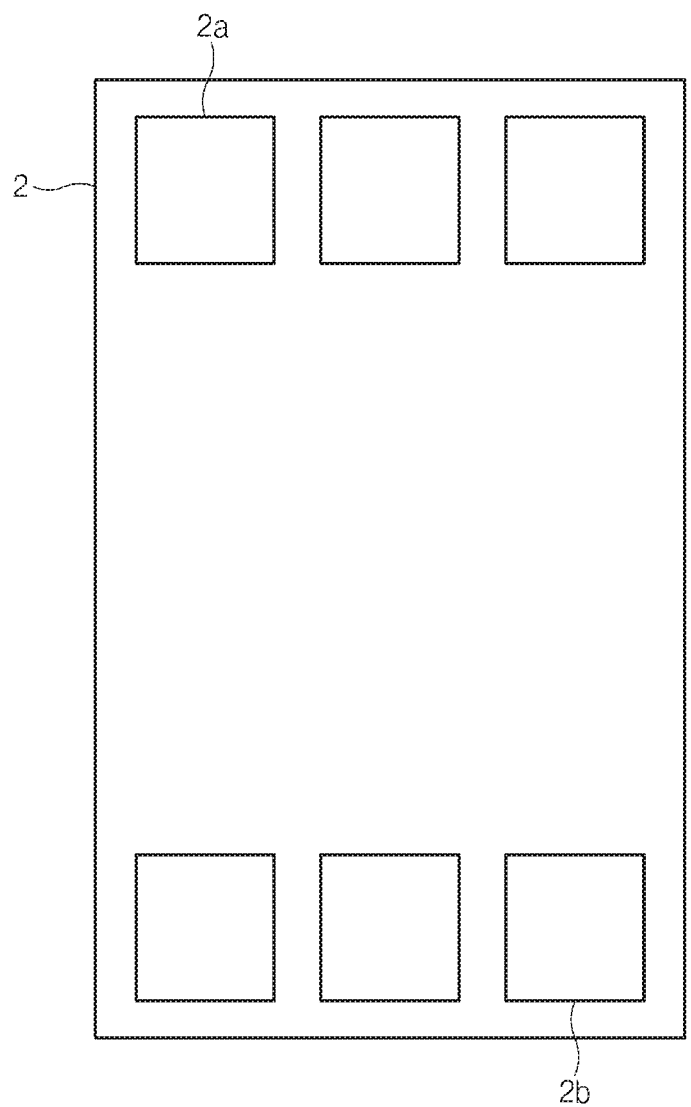
FIG. 2 illustrates a plan view of a bipolar plate illustrated in FIG. 1.

FIG. 1 illustrates a partial cross-sectional view of a fuel cell, to which a porous body for a fuel cell according to a first exemplary embodiment of the present disclosure is applied, and FIG. 2 illustrates a plan view of a bipolar plate illustrated in FIG. 1.

A porous body for a fuel cell (hereinafter referred to as the "porous body 1"), according to the first exemplary embodiment of the present disclosure, may be designed to form a gas channel 40 through which a reactant gas G flows in a predetermined direction. The reactant gas G may be air containing oxygen, but is not limited thereto. In other words, the reactant gas G may be hydrogen. As illustrated in FIG. 1, the porous body 1 may be interposed between a bipolar plate 2 and a gas diffusion layer 3.

In general, a membrane electrode assembly (MEA) 4 includes an electrolyte membrane (not shown), an anode attached to one surface of the electrolyte membrane, and a cathode 5 attached to the other surface of the electrolyte membrane.

The gas diffusion layer 3 may be disposed to be attached to the MEA 4. For example, the gas diffusion layer 3 may be disposed to be attached to the outer surface of the cathode 5, as illustrated in FIG. 1, but is not limited thereto. The gas diffusion layer 3 may be disposed to be attached to the outer surface of the anode. The gas diffusion layer 3 may allow the reactant gas G supplied through the gas channel 40 to be diffused and delivered to the anode or the cathode 5 or deliver electricity produced by the MEA 4 externally.

The bipolar plate 2 may be disposed to be attached to the outer surface of a main body 10, as illustrated in FIG. 1. The bipolar plate 2 may seal a fuel cell stack to prevent the reactant gas G passing through the gas channel 40 and water W from being leaked externally. As illustrated in FIG. 2, the bipolar plate 2 includes a supply manifold 2a supplying the reactant gas G from the outside to the gas channel 40, an exhaust manifold 2b discharging the reactant gas G having passed through the gas channel 40 and the water W externally, and a cooling channel (not shown) allowing a coolant for cooling the fuel cell to flow therethrough. For example, when the air is transported using the gas channel 40, the supply manifold 2a may be an air supply manifold that supplies the outside air to the gas channel 40, and the exhaust manifold 2b may be an air exhaust manifold that discharges the air having passed through the gas channel 40 and the water W externally.

Hereinafter, a direction toward an upstream part 40a of the gas channel 40 refers to a direction toward the supply manifold 2a, and a direction toward a downstream part 40b of the gas channel 40 refers to a direction toward the exhaust manifold 2b.

Figure 3:
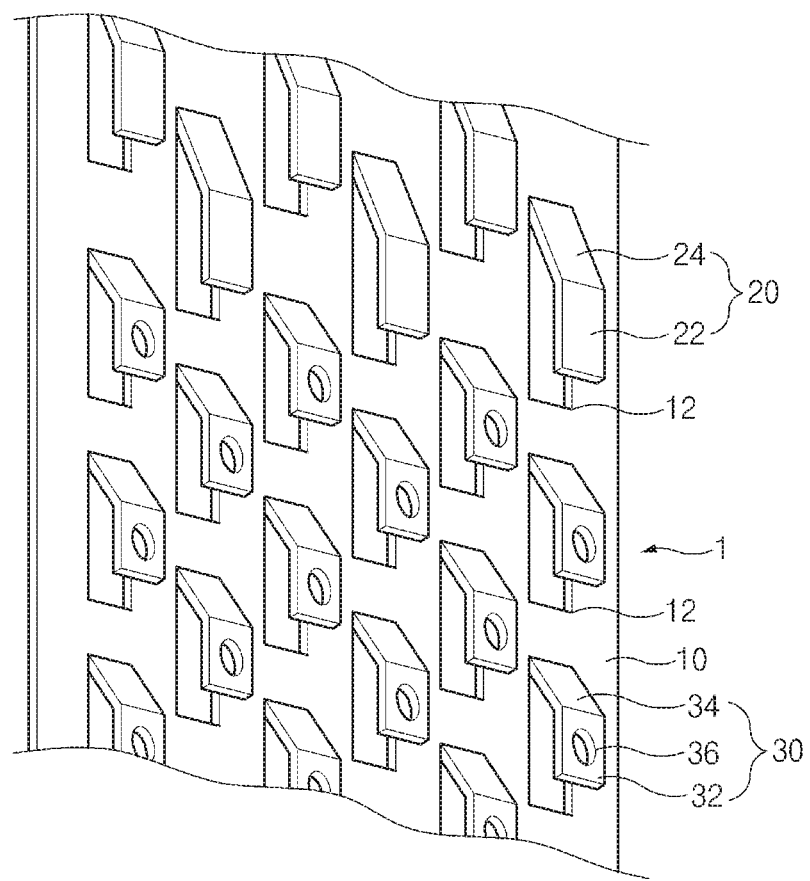
FIG. 3 illustrates a perspective view of the porous body for a fuel cell according to the first exemplary embodiment of the present disclosure.
Figure 4:
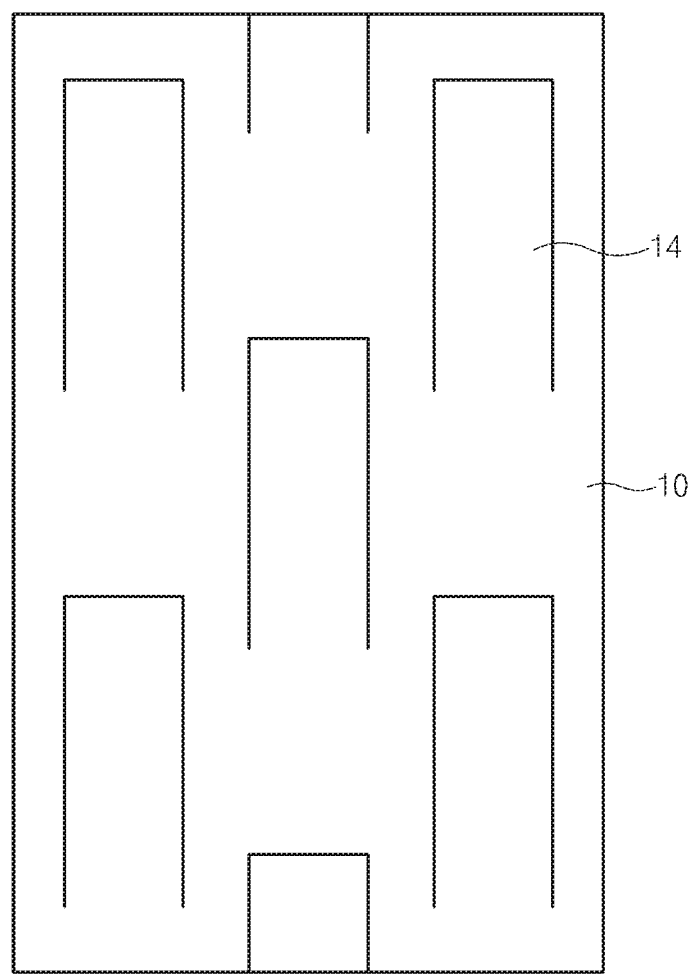
FIG. 4 illustrates a view explaining a method for forming ribs illustrated in FIG. 3.

FIG. 3 illustrates a perspective view of the porous body for a fuel cell according to the first exemplary embodiment of the present disclosure, and FIG. 4 illustrates a view explaining a method for forming ribs illustrated in FIG. 3.

As illustrated in FIG. 3, the porous body 1 includes the main body 10 forming a support frame of the porous body 1, and a plurality of ribs 20 and 30 forming the gas channel 40. The main body 10 may have the form of a plate having a predetermined area as illustrated in FIG. 3. The main body 10 may be formed of a metallic material, but is not limited thereto. The main body 10 includes a plurality of first holes 12 at predetermined intervals as illustrated in FIG. 3, but is not limited thereto. The main body 10 may be disposed to be attached to the inner surface of the bipolar plate 2 facing the gas diffusion layer 3, as illustrated in FIG. 1. Thus, the first holes 12 may be closed by the bipolar plate 2.

As illustrated in FIG. 3, the ribs 20 and 30 include land portions 22 and 32 that are disposed to contact the gas diffusion layer 3, and connecting portions 24 and 34 that connect the land portions 22 and 32 to the main body 10, respectively.

The method for forming the ribs 20 and 30 is not particularly limited. For example, the ribs 20 and 30 may be formed by individually cutting cut-out portions 14 of the main body 10, which are located at predetermined intervals, in the form of "⊏" as illustrated in FIG. 4. The land portions 22 and 32 and the connecting portions 24 and 34 may be formed by individually bending one end portions of the ribs 20 and 30 connected to the main body 10 and central portions of the ribs 20 and 30. As the ribs 20 and 30 are formed in the above-described manner, the first holes 12 may be formed in the cut-out portions 14 of the main body 10, respectively. In addition, the ribs 20 and 30 may be disposed at the intervals that are the same as the intervals of the first holes 12, and may have the same areas as those of the first holes 12. The ribs 20 and may be formed to allow the inner surfaces of one end portions of the first holes 12 toward the upstream part 40a of the gas channel 40 to be connected to the connecting portions 24 and 34, as illustrated in FIG. 3, but are not limited thereto.

The land portions 22 and 32 may be disposed to contact the outer surface of the gas diffusion layer 3 facing the inner surface of the bipolar plate 2, as illustrated in FIG. 1. Since the land portions 22 and 32 are disposed to be spaced apart from each other as illustrated in FIG. 1, a communicating hole 50 may be formed between the land portions 22 and 32 to allow the gas channel 40 and the gas diffusion layer 3 to communicate with each other. Thus, the reactant gas G passing through the gas channel 40 may be introduced to the gas diffusion layer 3 through the communicating hole 50, and the reactant gas G and the water W passing through the gas diffusion layer 3 may be introduced to the gas channel 40 through the communicating hole 50.

The connecting portions 24 and 34 may be inclined between the main body 10 and the gas diffusion layer 3 as illustrated in FIG. 1. For example, the connecting portions 24 and 34 may be inclined toward the downstream part 40b of the gas channel 40 as they are extended from the bipolar plate 2 to the gas diffusion layer 3. The connecting portions 24 and 34 may allow the main body 10 and the gas diffusion layer 3 to be spaced apart from each other by a predetermined interval to form the gas channel 40 as illustrated in FIG. 1. The gas channel 40 may transport the reactant gas G or the water W, introduced from the supply manifold 2a or the gas diffusion layer 3 to the gas channel 40, to the exhaust manifold 2b.

In a conventional fuel cell including a bipolar plate in which a gas channel is directly formed in one surface thereof, the amount of water distributed in an MEA is increased from an upstream part of the gas channel to a downstream part thereof. In the conventional fuel cell, the MEA becomes dry in the upstream part of the gas channel, and becomes wet in the downstream part of the gas channel, and thus the performance and durability of the fuel cell are degraded.

To solve this, the ribs 20 and 30 may have a novel structure in which the appropriate amount of water W is uniformly distributed over the entire region of the MEA 4. For example, as illustrated in FIG. 3, the ribs 20 and 30 may be classified into first ribs 20 disposed in the upstream part 40a of the gas channel 40 and second ribs 30 disposed below the first ribs 20 in the downstream part 40b of the gas channel 40, and the first ribs 20 and the second ribs 30 may have different structures. Hereinafter, the land portion 22 and the connecting portion 24 of the first rib 20 may be referred to as a first land portion 22 and a first connecting portion 24, respectively, and the land portion 32 and the connecting portion 34 of the second rib 30 may be referred to as a second land portion 32 and a second connecting portion 34, respectively.

The first ribs 20 and the second ribs 30 may be designed such that the water W passing through the gas diffusion layer 3 in the upstream part 40a of the gas channel 40 is difficult to be introduced to the gas channel 40, and the water W passing through the gas diffusion layer 3 in the downstream part 40b of the gas channel 40 is easy to be introduced to the gas channel 40.

For example, as illustrated in FIG. 3, the area of the second land portion 32 may be narrower than that of the first land portion 22 with respect to a direction of gas flow. The area of the communicating hole 50 may be relatively increased in the downstream part 40b of the gas channel 40 compared to in the upstream part 40a of the gas channel 40, as illustrated in FIG. 1.

When the water W meets the land portions 22 and 32 while passing through the gas diffusion layer 3, it may not be permeated through the land portions 22 and 32 to be directly introduced to the gas channel 40, but it may move along the land portions 22 and 32 to be introduced to the gas channel 40 through the communicating holes 50. Thus, a path of the water W for flowing from the gas diffusion layer 3 to the gas channel 40 may be relatively increased in the upstream part 40a of the gas channel 40 where the first land portions 22 are located, compared to the downstream part 40b of the gas channel 40 where the second land portions 32 are located. Therefore, the water W passing through the gas diffusion layer 3 in the upstream part 40a of the gas channel 40 may be relatively difficult to be introduced to the gas channel 40 through the communicating holes 50, but the water W passing through the gas diffusion layer 3 in the downstream part 40b of the gas channel 40 may be relatively easy to be introduced to the gas channel 40 through the communicating holes 50. Thus, the first ribs 20 and the second ribs 30 may be designed to allow the water W to be trapped by the gas diffusion layer 3 in the upstream part 40a of the gas channel 40 and allow the water W to be smoothly discharged from the gas diffusion layer 3 in the downstream part 40b of the gas channel 40, thereby allowing the appropriate amount of water W to be uniformly distributed over the entire region of the gas diffusion layer 3 and the MEA 4.

For example, each of the second ribs 30 may have a second hole 36 perforated in the second land portion 32, as illustrated in FIG. 3. The second hole 36 may further increase the area of the communicating hole 50 in the downstream part 40b of the gas channel 40, thereby smoothly discharging the water W from the gas diffusion layer 3 in the downstream part 40b of the gas channel 40. Meanwhile, in FIG. 3, in a state in which the area of the second land portion 32 is less than the area of the first land portion 22, the second hole 36 is additionally formed in the second land portion 32, but the structure of the ribs is not limited thereto. In other words, in a state in which the first and second land portions 22 and 32 are formed to have the same area, the second hole 36 may be formed in the second land portion 32 so as to adjust the area of the second land portion 32 to be substantially less than the area of the first land portion 22.

For example, an angle $\theta 1$ of inclination of the first connecting portion 24 with respect to the direction of flow of the reactant gas G may be lower than an angle $\theta 2$ of inclination of the second connecting portion 34 with respect to the direction of flow of the reactant gas G, as illustrated in FIG. 1.

A portion of the water W introduced to the gas channel 40 through the communicating hole 50 may meet the first connecting portion 24 or the second connecting portion 34 to be condensed on the first connecting portion 24 or the second connecting portion 34. A portion of the condensed water W may be evaporated by heat of the fuel cell and may be reintroduced to the gas diffusion layer 3 through the communicating hole 50. Since the angle of inclination of the first connecting portion is lower than the angle of inclination of the second connecting portion 34, the area of the first connecting portion 24 may be greater than that of the second connecting portion 34. Thus, a greater amount of water W may be condensed on the surface of the first connecting portion 24 compared to the surface of the second connecting portion 34. Therefore, the first connecting portion 24 may allow the greater amount of water W to be reintroduced to the gas diffusion layer 3 compared to the second connecting portion 34, thereby more effectively preventing the MEA 4 from being dried in the upstream part 40a of the gas channel 40.

Since the reactant gas G is introduced to the gas diffusion layer 3 through the communicating holes 50 in the course of passing through the gas channel 40 to be converted into product water through oxidation reduction reaction, a flow rate of the reactant gas G may be reduced from the upstream part 40a of the gas channel 40 to the downstream part 40b thereof. However, the area of the communicating hole 50 is larger in the downstream part 40b of the gas channel 40 than in the upstream part 40a of the gas channel 40. This design may compensate for a deviation in the flow rate of the reactant gas G, and thus the reactant gas G may be uniformly supplied to the gas diffusion layer 3 throughout the upstream part 40a and the downstream part 40b of the gas channel 40.

Further, the ribs 20 and 30 may be classified into the first ribs 20 and the second ribs 30 having different structures as described above, but are not limited thereto. For example, the ribs 20 and 30 may be designed such that the areas of the land portions 22 and 32 may be gradually narrowed from the upstream part 40a of the gas channel 40 to the downstream part 40b thereof without distinguishing between the first ribs 20 and the second ribs 30. In this example, the angles of inclination of the connecting portions 24 and 34 may be increased from the upstream part 40a of the gas channel 40 to the downstream part 40b thereof, but are not limited thereto.

Figure 5:
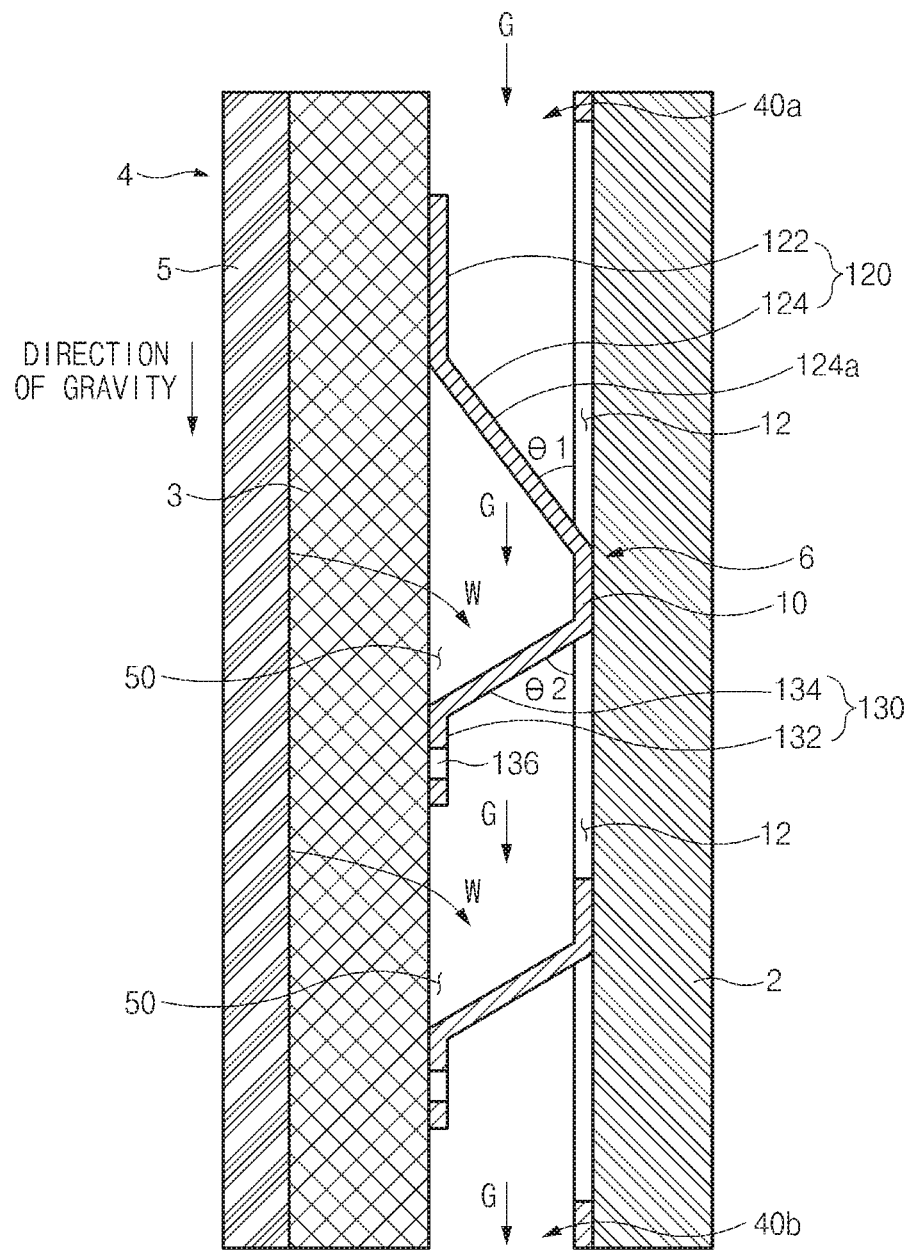
FIG. 5 illustrates a partial cross-sectional view of a fuel cell, to which a porous body for a fuel cell according to a second exemplary embodiment of the present disclosure is applied.

FIG. 5 illustrates a partial cross-sectional view of a fuel cell, to which a porous body for a fuel cell according to a second exemplary embodiment of the present disclosure is applied.

A porous body for a fuel cell (hereinafter referred to as the "porous body 6"), according to the second exemplary embodiment of the present disclosure, differs from the above-described porous body 1 with respect to the structure of ribs 120 and 130. The elements of the porous body 6, which are the same as those of the porous body 1, will be designated by the same reference numerals in the drawings.

In general, a fuel cell is designed to allow the direction of flow of the reactant gas G and the direction of gravity to be parallel in consideration of the fluidity of the reactant gas G. Thus, the fuel cell including the porous body 6 may also be designed to allow the direction of flow of the reactant gas G and the direction of gravity to be parallel. Based on this design, the first and second ribs 120 and 130 may be provided to include first and second connecting portions 124 and 134 that are inclined in opposite directions. The first ribs 120 may be disposed in the upstream part 40a of the gas channel 40, and the second ribs 130 may be disposed below the first ribs 120 in the downstream part 40b of the gas channel 40.

As illustrated in FIG. 5, the first connecting portion 124 may be inclined in a direction opposing the direction of gravity as it is extended from the main body 10 to a first land portion 122. On the contrary, as illustrated in FIG. 5, the second connecting portion 134 may be inclined in a direction toward the direction of gravity as it is extended from the main body 10 to a second land portion 132. By forming the first and second connecting portions 124 and 134 in the above-described manner, the water W passing through the gas channel 40 may easily be condensed on the first connecting portion 124 compared to the second connecting portion 134. Therefore, the porous body 6 may more effectively prevent the MEA from being dried in the upstream part 40a of the gas channel 40 in which the first ribs 120 are located. Meanwhile, one surface 124a of the first connecting portion 124 on which the water W is condensed may be roughened using a sandblaster or the like to allow the water W to be condensed more easily.

Meanwhile, the reference numeral "136" in FIG. 5 designates a second hole of the second land portion 132.

Figure 6:
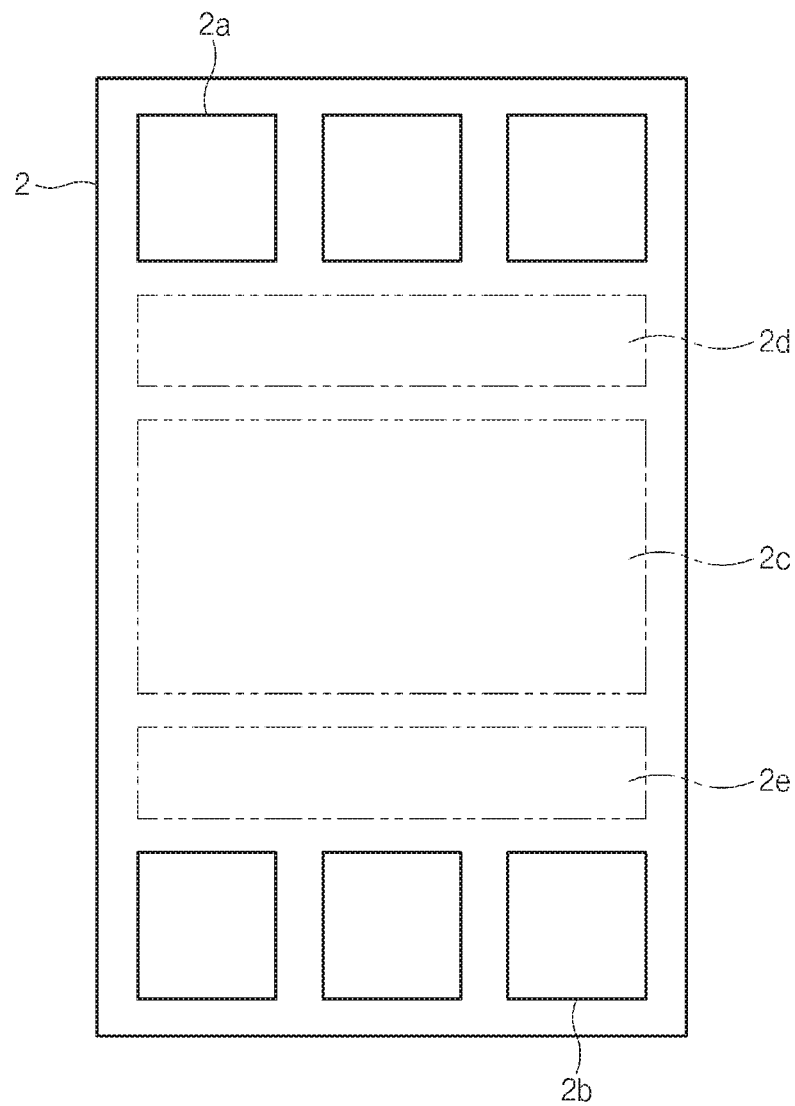
FIG. 6 illustrates a plan view of a location relationship between a bipolar plate and a gas diffusion layer.
Figure 7:
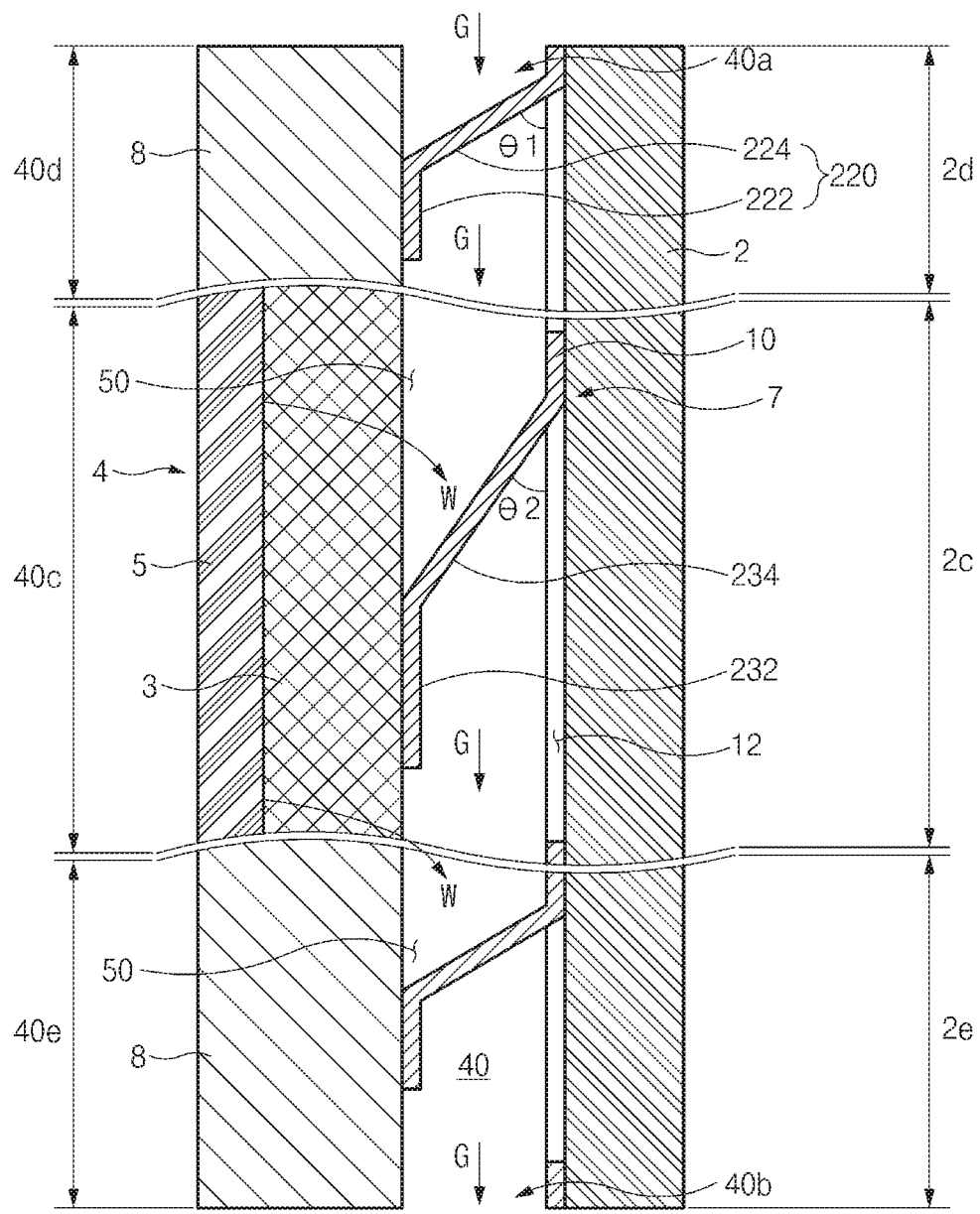
FIG. 7 illustrates a partial cross-sectional view of a fuel cell, to which a porous body for a fuel cell according to a third exemplary embodiment of the present disclosure is applied.

FIG. 6 illustrates a plan view of a location relationship between a bipolar plate and a gas diffusion layer, and FIG. 7 illustrates a partial cross-sectional view of a fuel cell, to which a porous body for a fuel cell according to a third exemplary embodiment of the present disclosure is applied.

Referring to FIG. 6, the gas diffusion layer 3 and the MEA 4 may have an area less than that of the bipolar plate 2, and may be disposed to face a power generation region 2c of the bipolar plate 2 located between the supply manifold 2a and the exhaust manifold 2b. In addition, the power generation region 2c of the bipolar plate 2 may be spaced apart from each of the supply manifold 2a and the exhaust manifold 2b by a predetermined interval. In addition, a diffusion region 2d may be set in the interval between the supply manifold 2a and the power generation region 2c, and an exhaust region 2e may be set in the interval between the power generation region 2c and the exhaust manifold 2b.

Referring to FIG. 7, a porous body for a fuel cell (hereinafter referred to as the "porous body 7"), according to the third exemplary embodiment of the present disclosure, may be interposed between the bipolar plate 2 and the gas diffusion layer 3 to form the gas channel 40. As illustrated in FIG. 7, the gas channel 40 may be divided into a power generation section 40c located in a midstream part of the gas channel 40, a diffusion section 40d located above the power generation section 40c in the upstream part 40a of the gas channel 40, and an exhaust section 40e located below the power generation section 40c in the downstream part 40b of the gas channel 40.

The power generation section 40c may be interposed between the gas diffusion layer 3 and the power generation region 2c, and may face each of the gas diffusion layer 3 and the power generation region 2c. The diffusion section 40d may be interposed between a rim member 8 and the diffusion region 2d, and may face each of the rim member 8 and the diffusion region 2d. The rim member 8 may be mounted on the edges of the gas diffusion layer 3 and the MEA 4 to fix the gas diffusion layer 3 and the MEA 4. The exhaust section 40e may be interposed between the rim member 8 and the exhaust region 2e, and may face each of the rim member 8 and the exhaust region 2e.

The porous body 7 may be designed to adjust the fluidity of the reactant gas G differently according to respective sections of the gas channel 40.

For example, the porous body 7 may be designed such that the areas of land portions 222 of ribs 220 located in the diffusion section 40d and the exhaust section 40e may be narrower with respect to the direction of gas flow than those of land portions 232 of ribs 230 located in the power generation section 40c. To this end, the porous body 7 includes, as illustrated in FIG. 7, first ribs 220 located in the diffusion section 40*d* and the exhaust section 40*e*, and second ribs 230 located in the power generation section 40*c*.

Each of the first ribs 220 includes a first land portion 222 disposed to contact the rim member 8, and a first connecting portion 224 connecting the first land portion 222 to the main body 10. Each of the second ribs 230 includes a second land portion 232 disposed to contact the gas diffusion layer 3, and a second connecting portion 234 connecting the second land portion 232 to the main body 10.

The area of the first land portion 222 may be narrower with respect to the direction of gas flow than that of the second land portion 232, as illustrated in FIG. 7. Thus, the reactant gas G introduced through the supply manifold 2*a* may be smoothly diffused in the diffusion section 40*d* of the gas channel 40 to be uniformly supplied to the power generation section 40*c*. In addition, the flow resistance of the reactant gas G may be effectively decreased in the exhaust section 40*e* of the gas channel 40 to allow the reactant gas G to be smoothly discharged from the exhaust manifold 2*b*.

As illustrated in FIG. 7, an angle θ1 of inclination of the first connecting portion 224 with respect to the direction of flow of the reactant gas G may be higher than an angle θ2 of inclination of the second connecting portion 234 with respect to the direction of flow of the reactant gas G. Thus, the reactant gas G introduced through the supply manifold 2*a* may be smoothly diffused in the diffusion section 40*d* of the gas channel 40 to be uniformly supplied to the power generation section 40*c*. In addition, the flow resistance of the reactant gas G may be effectively decreased in the exhaust section 40*e* of the gas channel 40 to allow the reactant gas G to be smoothly discharged from the exhaust manifold 2*b*.

Further, the porous body 1, 6, or 7 may be interposed between the bipolar plate 2 and the gas diffusion layer 3 as described above, but is not limited thereto. For example, when the gas diffusion layer 3 is removed, the porous body may be interposed between the bipolar plate 2 and the anode or the cathode 5 of the MEA 4. In this example, the land portions may be disposed to contact the anode or the cathode 5.

As set forth above, the porous body for a fuel cell according to the exemplary embodiments of the present disclosure may have the following effects:

First, the water may be uniformly distributed to the gas diffusion layer and the MEA to thereby prevent the MEA from being dried in the upstream part of the gas channel and being wet in the downstream part of the gas channel compared to an appropriate condition. Thus, the performance and durability of the fuel cell may be improved.

Second, the flow resistance in the diffusion section and the exhaust section of the gas channel may be selectively decreased to allow the reactant gas to be smoothly supplied and discharged.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A porous body for a fuel cell, which is interposed between a membrane-electrode assembly (MEA) and a bipolar plate to form a gas channel through which a reactant gas flows in a predetermined direction, the porous body comprising:
a main body disposed to contact the bipolar plate; and
a plurality of ribs each including a land portion disposed to contact the MEA and a connecting portion connecting the land portion to the main body,
wherein a the connecting portion is inclined at a predetermined angle of inclination with respect to a direction of gas flow, and
wherein the predetermined angle of inclination is increased from an upstream part to a downstream part of the gas channel in at least some sections of the gas channel.

2. The porous body according to claim 1, wherein the main body includes a plurality of first holes perforated at predetermined intervals, and the connecting portion of each of the plurality of ribs extends from an inner surface of each of the plurality of first holes and is connected to the inner surface of each of the plurality of first holes.

3. The porous body according to claim 2, wherein a sum of an area of the land portion and an area of the connecting portion is the same as an area of each of the plurality of first holes.

4. The porous body according to claim 1, wherein
area of the land portion is gradually narrowed from the upstream part of the gas channel to the downstream part thereof.

5. The porous body according to claim 1, wherein a gas diffusion layer is attached to the MEA, and
the porous body is interposed between the gas diffusion layer and the bipolar plate.

6. A porous body for a fuel cell, which is interposed between a membrane-electrode assembly (MEA) and a bipolar plate to form a gas channel through which a reactant gas flows in a predetermined direction, the porous body comprising:
a main body disposed to contact the bipolar plate; and
a plurality of ribs each including a land portion disposed to contact the MEA and a connecting portion connecting the land portion to the main body,
wherein an area of the land portion is gradually narrowed from an upstream part to a downstream part of the gas channel,
wherein the plurality of ribs are classified into a plurality of first ribs located in the upstream part of the gas channel and a plurality of second ribs located below the plurality of first ribs in the downstream part of the gas channel,
wherein each of the plurality of first ribs includes a first land portion disposed to contact the MEA and a first connecting portion connecting the first land portion to the main body,
wherein each of the plurality of second ribs includes a second land portion disposed to contact the MEA and having an area narrower than that of the first land portion and a second connecting portion connecting the second land portion to the main body, and
wherein each of the plurality of second ribs includes a second hole perforated in the second land portion.

7. The porous body according to claim 6, wherein an area of the first land portion is gradually narrowed from the upstream part of the gas channel to the downstream part thereof, and
wherein an area of the second land portion is gradually narrowed from the upstream part of the gas channel to the downstream part thereof.

8. The porous body according to claim 6, wherein a direction of gas flow is parallel to a direction of gravity, the first connecting portion is inclined in a direction opposing the direction of gravity as the first connecting portion extends from the main body to the first land portion, and the second connecting portion is inclined in a direction toward the direction of gravity as the second connecting portion extends from the main body to the second land portion.

9. The porous body according to claim 6, wherein the main body includes a plurality of first holes perforated at predetermined intervals, and the connecting portion of each of the plurality of ribs extends from an inner surface of each of the plurality of first holes and is connected to the inner surface of each of the plurality of first holes.

10. The porous body according to claim 9, wherein a sum of an area of the land portion and an area of the connecting portion is the same as an area of each of the plurality of first holes.

11. The porous body according to claim 6, wherein a gas diffusion layer is attached to the MEA, and the porous body is interposed between the gas diffusion layer and the bipolar plate.

\* \* \* \* \*